United States Patent [19]

Kester

[11] Patent Number: 4,540,873

[45] Date of Patent: Sep. 10, 1985

[54] SYSTEM FOR BREAKING A TENSIONED CONNECTING ELEMENT

[75] Inventor: Gerardus J. A. N. Kester, Delft, Netherlands

[73] Assignee: Fokker B.V., Schiphol, Netherlands

[21] Appl. No.: 585,890

[22] Filed: Mar. 2, 1984

[30] Foreign Application Priority Data

Mar. 3, 1983 [NL] Netherlands ............................ 8300788

[51] Int. Cl.³ ............................ H05B 1/00; B26F 3/12
[52] U.S. Cl. ..................................... 219/200; 219/201; 83/171; 30/116
[58] Field of Search ................. 219/200, 201; 338/226, 338/232, 252, 259; 83/171; 166/54.5; 30/116, 117; 441/2, 23, 33

[56] References Cited

U.S. PATENT DOCUMENTS 2,726,706  12/1955  Hakomaki ............................ 83/171
3,159,124  12/1964  Rubin .................................. 83/171
4,430,552   2/1984  Peterson ............................. 219/200

FOREIGN PATENT DOCUMENTS 0059673  8/1982  European Pat. Off. .
1535034  8/1969  Fed. Rep. of Germany .

Primary Examiner—Roy N. Envall, Jr.
Assistant Examiner—Teresa J. Walberg
Attorney, Agent, or Firm—Handal & Morofsky

[57] ABSTRACT

A system for releasing parts of a spacecraft construction that are contained by the use of a tensioned cable, made of a material that will degrade or decompose under the influence of heat, and stretched between two supporting elements of the construction. At least one heating element is connected to an electrical power source mounted into a frame that is attached to the spacecraft structure, in a manner such that the heating element and the opposed cable section are pressed towards each other. The tension in the cable is of sufficient degree to displace the ruptured ends of the cable, when broken, out of contact with the heating element.

8 Claims, 8 Drawing Figures

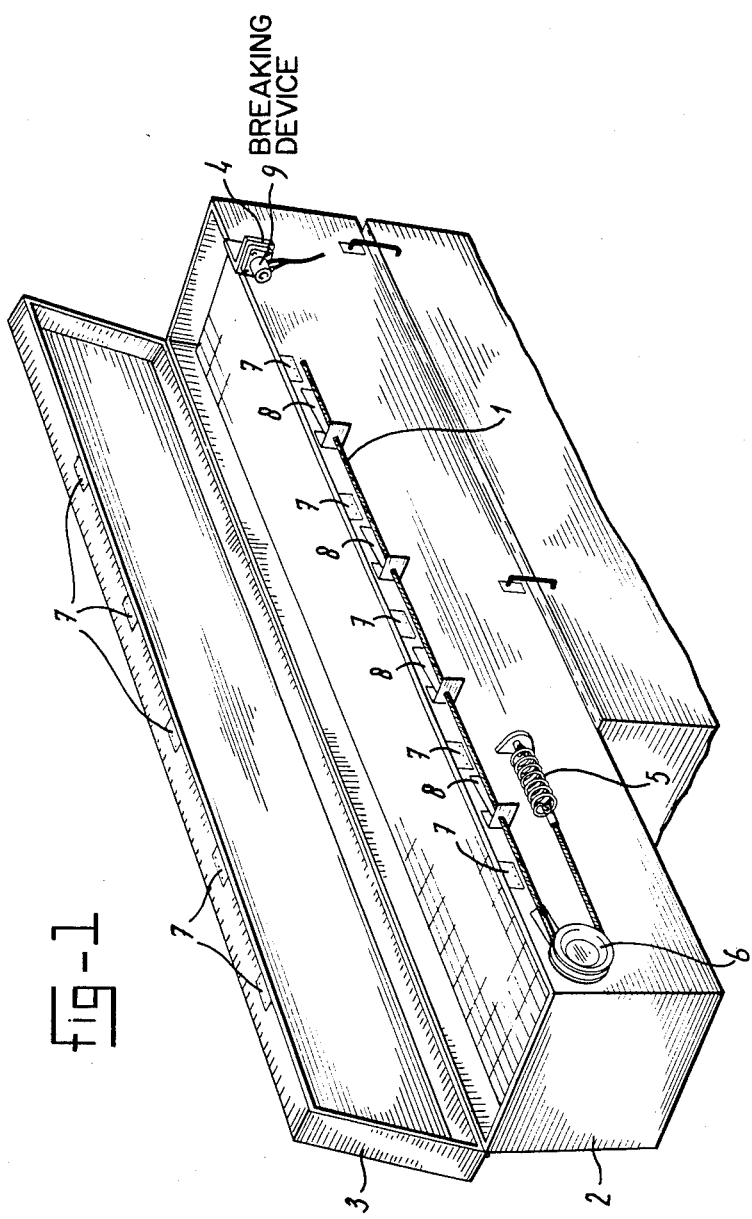

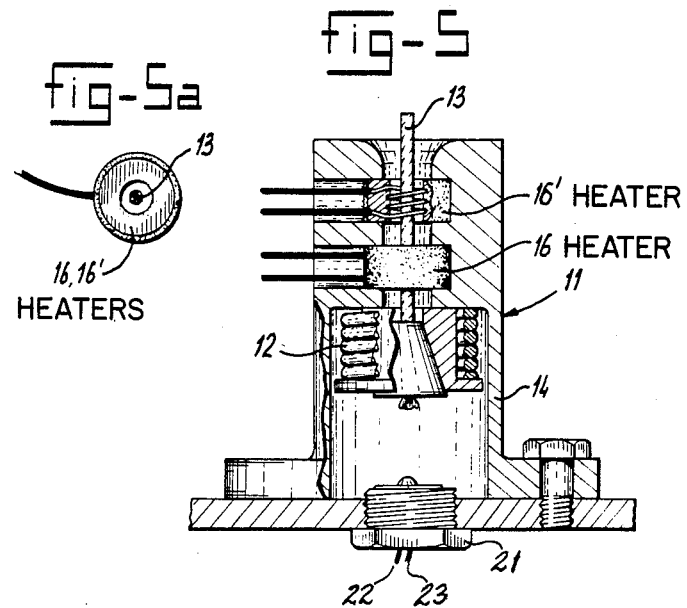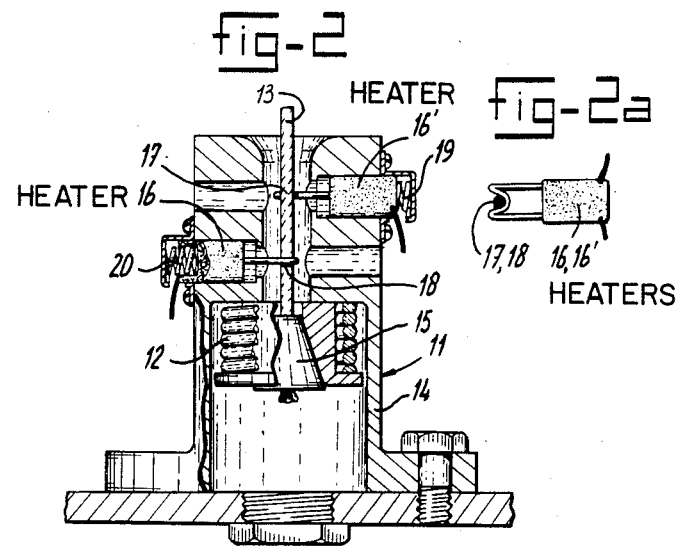

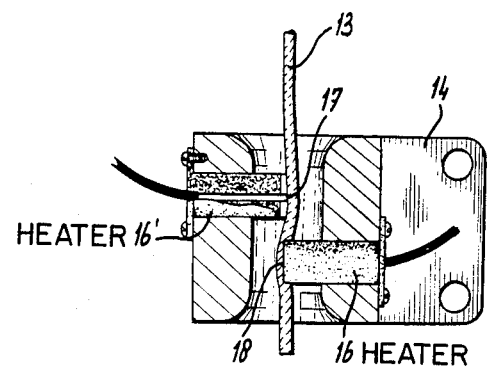
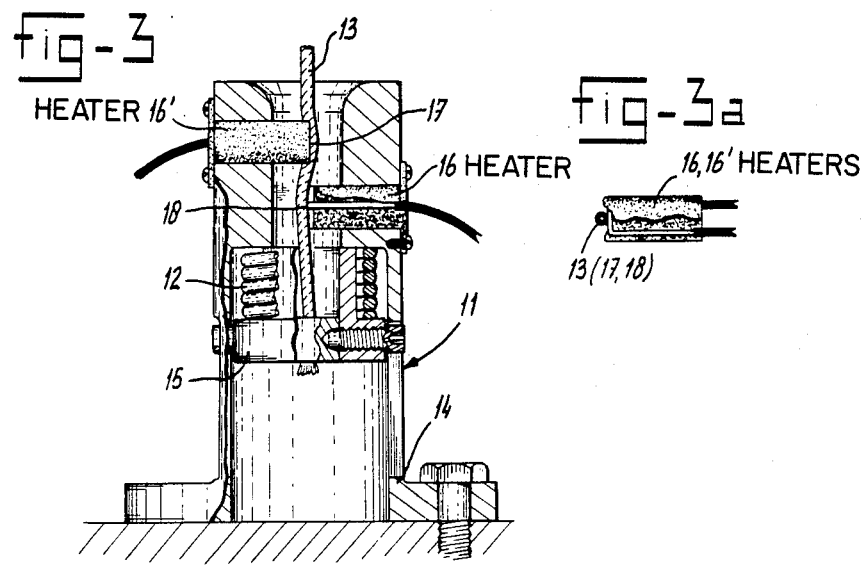

SYSTEM FOR BREAKING A TENSIONED CONNECTING ELEMENT

The invention relates to a system for breaking a tensioned connecting element by means of which until the moment of breakage parts of a construction are maintained in a predetermined position, which system is especially destined for application in a spacecraft.

Constructions of this type are extensively used in deployable and/or foldable constructions especially in or on spacecrafts, such as solar panels, antennae, etc. By means of a system of locking elements, coupled to the tensioned connecting element, the folded construction is maintained in the locked situation until the connecting element is broken, whereafter the construction is released and is able to deploy. Such systems are also used for removable or rejectable covers on instruments on board of observation satellites.

Usually spacecrafts possess systems or parts thereof which only start functioning after the spacecraft is brought into space. During the transport from the earth to the position in space these systems are folded together and covered such that the volume thereof is restricted and that these parts are fixed and/or covered such that the chance that they become damaged during the transport of the spacecraft from the earth to the position in space by mechanical and/or acoustical loads or by thermal or chemical influences is restricted to an acceptable minimum level, or the useful life of said parts is extended. For this purpose the construction concerned may be stowed into a box with a lid, or can comprise a rejectable cover whereby the lid or cover is coupled to a mechanism taking care of opening said lid or cover at the desired moment. It is also possible to realize a temporarily mechanical pretension of bearings.

A system of the type mentioned in the preamble is known from the European patent application No. 0 059 673. In this known system the connection element is embodied as a wire or cable positioned between a fixed support element and a tensioned spring, of which the other end is connected to a further fixed support element. This pretensioned cable is coupled to a number of locking strips. At the moment of breakage of the cable, said cable will be shifted by means of the pretensioned spring thereby tearing the locking strips with the result that parts of the spacecraft, which until that moment were confined to said locking strips, are released. In said European patent application nothing is said, however, about the method for breaking the tensioned cable.

It is known from the prior art that a cable maintaining a spring in a pretensioned condition, can be broken by a mechanical cutting action, eventually activated explosively. This last method, however, involves the risk, at least with spacecrafts, that residual products of the explosive material will be deposited onto the spacecraft or will float into the direct neighbourhood thereby influencing the functioning of certain systems thereby in a very negative way. In devices, in which in this respect measures are carried out to hold the residual products of the explosive material, after a shorter or longer time period corrosion appears which in itself involves a danger for the proper functioning of the spacecraft. Therefore breaking methods whereby little or no harmful particles or gases are released, are preferred.

An object of the invention is now to provide a system which does not have the abovementioned disadvantages.

In agreement with said object the invention provides now a system of the type described in the preamble which is characterized in that the system comprises means for locally, and with short duration heating of a connecting element, and that a connecting element is made of a material the strength of which degrades under the influence of heat such that the element is able to break. By activating the mentioned heating means at the correct moment the strength of the material of the connecting element is degraded locally until such a level that the connecting element will break without releasing thereby harmful residual products, whereby furthermore in principle no moving parts are necessary.

Although it is possible to apply various heating means it is preferred that said means comprise at least an electrical heating element. Especially on board of spacecrafts electrical heating elements have the advantage that the functioning thereof is very clean and that sufficient electrical power is available.

To prevent the unnecessary consumption of electrical energy and to prevent furthermore eventual further heating of the ruptured ends of the connecting element it is preferred that means are present for detecting the actual breakage of the connecting element, so that after detection the heating means can be switched off.

To increase the certainty factor it is preferred that at least two heating means are present positioned at a mutual distance in the elongational direction of the connecting element.

In case these heating elements are making contact with the connecting element, which is not always necessary, it is preferred that both heating elements are pressed against the connecting element from radially opposed directions.

To guarantee a good contact between the heating means and the connecting element it is preferred that the heating means are resiliently pressed against said connecting element. Another solution is to extend the tensioned connecting element along such a path that there has to be direct contact with at least one of the heating means.

In case the heating means are pressing against the connecting element it is preferred that the part of the heating element making contact with the connecting element has not a mechanical cutting function. An unintended cutting of the connecting element is prevented therewith. Such a risk appears e.g. in case the tensioned connecting element is forced to follow in between both heating elements a path diverting from the normal route such that the cable is forced to come into contact with the end parts of the related heating means.

It is furthermore possible to embody the support element such that the connecting element at the related end thereof is clamped into a holding element, and that heating means are installed within said holding element. The advantage thereof is a very compact and very small construction.

As is already observed the connecting element is tensioned by attaching said connecting element at one side to a fixed support element and attaching said element at the other side to a pretensioned spring. Preferably, however, the connecting element is tensioned such that after breakage of said connecting element both ruptured end parts of said element are drawn outside the effective area of the heating elements. In relation thereto it is e.g. possible to pretension also the holding element. In that case a local overheating of the connecting element, before the heating element is switched off, is with certainty prevented.

A very suitable material for said connecting element are aramide fibers.

In the following part of the description the invention will be discussed in more detail with reference to the attached drawings.

FIG. 1 illustrates the application of a tensioned connecting element for maintaining the cover onto a box until the moment of breakage.

FIGS. 2 and 2a illustrates a first embodiment of a system according to the invention.

FIGS. 3 and 3a illustrates a second embodiment of a system according to the invention.

FIG. 4 illustrates a third embodiment of the system according to the invention.

FIGS. 5 and 5a illustrates a fourth embodiment of the system according to the invention.

FIG. 1 illustrates a tensioned connecting element 1 embodied as a cable and applied to a box 2 with a cover 3. The tensioned connecting element is attached between a support element 4 and a spring 5 and runs thereby e.g. over a roll 6. Alongside the tensioned connecting element the locking strips 7,8 are positioned by means of which the cover 3 is connected to the box 2. Near one end of the tensioned cable a device 9 is positioned for breaking the tensioned connecting element. When such a device is activated the cable will break and the spring 5 will draw the wire to one side tearing thereby the locking strips so that the cover 3 will be released from the box 2, which is the situation illustrated in the figure.

In the FIGS. 2-5 four embodiments are illustrated of the device for breaking the cable.

The embodiment of FIG. 2 comprises a housing 11 with a foot 14 for attaching the housing to the body of the spacecraft. In the foot 14 a spring 12 is positioned which in the operating condition of the system is tensioning the cable 13 coming out of the system. The cable 13 ends into a holding element 15 in the foot of the housing. The difference between the free length of the spring and the completely compressed length thereof is such that, taking into account the elastical stretch and creep of the wire material and the increase of length at the rupture position during the heating of the cable, a sufficient tension will be maintained into the wire until the moment of complete breakage. The housing 11 comprises two or more electrical heating elements 16, 16' which are maintained in contact with the cable at the rupture positions 17, 18 to be able to supply locally a concentrated amount of heating energy. In this embodiment each heating element is pressed by a spring 19, 20 against said cable, whereby in combination with the cable tension such a contact pressure is obtained that a very good and very local energy transfer from each element to the cable 13 is realized.

FIG. 2a illustrates how the front part of each of the heating elements 16, 16' is formed and how this part presses against the cable 13 at the rupture positions 17, 18.

FIG. 3 illustrates a second embodiment of the system according to the invention in which corresponding parts are indicated by the same reference numbers. The principal difference between this embodiment and the embodiment which was described with reference to FIG. 2 is that the heating elements in this case are positioned such that they are forced to make contact with the tensioned cable. It is therefore not necessary to install springs into each of the heating elements to guarantee a sufficient contact pressure. Furthermore, the embodiment of the holding element 15 differs from the embodiment in FIG. 2.

FIG. 3a illustrates the heating element in more detail.

FIG. 4 illustrates a third embodiment of the system according to the invention, similar to the embodiment in FIG. 3, however, destined now for application onto a tensioned cable which is tensioned and connected independent of the device for breaking the cable in a further not illustrated way. Therefore in this embodiment the holding element and the spring cooperating therewith are deleted. By a correct positioning of the system the heating elements are forced to make contact with the connecting cable.

Finally, FIG. 5 illustrates a fourth embodiment of the system according to the invention in which the heating elements are positioned such that there is no material contact between the heating elements and the cable. This gives the guarantee that also after breakage of the cable said cable will not for one reason or another be hold back by the heating elements.

FIG. 5a illustrates a cross-section through one of the heating elements.

The use of more than one heating element is not in the first place necessary to let the wire come out of the system axially, but, and that applies to all four illustrated embodiments, to decrease the chance of failure of the system. If unexpectedly the heating element, which was switched on first does not function properly, then there is still an element in reserve.

After breakage of the cable at the positions 17, 18 that part of the wire which is coupled to the folded or closed construction, will be drawn out of the system under the influence of the external spring tension. The other part of the cable connected to the foot of the holder will, in case the system comprises a spring, be drawn back such that none of the heating elements is in contact any more with the cable so that a further degrading of that part of the cable caused by eventual afterglow of the heating elements is avoided. Unnecessary chemical reactions which could lead to more decomposition products then will appear during the very short on-off functioning of the instrument, will be prevented.

In spacecraft applications such as communcations satellites and earth observation satellites, the diameter of the cable for the device will be determined, besides by the combination of material properties, by the tension in the wire resulting from loads exerted by the system to which the cable is coupled. Determining material properties are: the specifical tensile strength, the specifical heat capacity, the creep characteristics, the specific weight, the change of the mechanical characteristics under thermal influences and the nature and amount of eventual decomposition products released when the material is degradated.

Based on a certain diameter the cable will be embodied such that there is an optimal contact surface between the wire and the heating element. The term embodiment covers in this respect the form and fullness of the wire cross-section (round, flat, massive, tubular), and/or the composition of the wire as a strand or the composition out of a number of strands by spinning or twisting. With an optimum contact surface the energy transfer from the heating elements will be concentrated onto a small cross-section of the cable minimizing thereby the necessary energy for the breaking process so that a certain standard period until the moment of breakage can be defined per heating element.

After breakage of the wire no energy is withdrawn from the heating element and therefore the heat of the element will increase. This increase of heat can be used as a signal to switch off the energy supply to the system. For safety reasons a switch can be installed within the foot of the system which switch can be actuated by the therein present spring after breakage of the cable.

Experiments have shown that aramide fibers (e.g. Kevlar 49) are very suitable for use in the system. Synthetic fibers are preferred above metal or glasseous fibers.

It is observed that the system according to the invention, especially in spacecraft applications, is destined in general to function only once within a predetermined program, within the scope of which program in general a very short time period is available for functioning of the system. From the standpoint of energy consumption it is furthermore desired to restrict the time period in which the system has to function. It is therefore preferred to select the power capacity of the heating means and/or the material characteristics of the connecting element such that after switching the heating means on the connecting element will break within a relatively short time period. A period of maximal several minutes, more especially a period shorter than one minute is preferred.

I claim:

1. A system for releasing parts of a space craft construction, which parts are maintained in a predetermined position within the construction, said system comprising:
   (a) a tensioned cable element, made of a material that will degrade under influence of heat, stretched between two supporting elements of the construction thereby maintaining said parts into said predetermined position, and
   (b) at least one electrical heating element connectable to an electrical power source and mounted into a frame attached to a space craft structure, such that said heating element and an opposed cable section are pressed towards each other,
   the tension in said cable being sufficient to displace ruptured end parts of the cable, after its breakage, out of contact with said heating element.

2. The system of claim 1, wherein said electrical heating element is pressed against the cable by means of a spring.

3. The system of claim 1, wherein two electrical heating elements are mounted into said frame at a predetermined distance from each other viewed in a longitudinal direction of the cable, and both heating elements are pressed against said cable from radially opposed direction.

4. The system of claim 1, wherein two electrical heating elements are mounted into said frame at a predetermined distance from each other viewed in a longitudinal direction of the cable such that they force the tensioned cable to follow a path other than a straight line between both heating elements.

5. The system according to claim 1 wherein said frame in which the heating element is mounted, additionally functions as one of said supporting elements, and a corresponding cable end is attached to a holding element that is biased within said supporting element by a spring such that, after breakage of the cable, said holding element, together with a correspondingly attached cable section, will be moved by said spring, thereby drawing the ruptured end part of said cable out of reach of said heating element.

6. The system according to claim 1 characterized in that the cable is made of aramide fibers.

7. The system according to claim 1 wherein the heating means has a capacity and material characteristics of the cable are selected such that after switching on the heating means said cable will break within several minutes.

8. The system according to claim 1 additionally comprising means for detecting the actual breaking moment of the connecting element to thereafter switch off the heating means.

* * * * *